(12) United States Patent
Kanterakis

(10) Patent No.: US 7,965,237 B2
(45) Date of Patent: Jun. 21, 2011

(54) MOBILE SYSTEM AND METHOD FOR POSITION ESTIMATION

(75) Inventor: Emmanuel Kanterakis, North Brunswick, NJ (US)

(73) Assignee: CACI Technologies, Inc., Eatontown, NJ (US)

( * ) Notice: Subject to any disclaimer, the term of this patent is extended or adjusted under 35 U.S.C. 154(b) by 196 days.

(21) Appl. No.: 12/457,264

(22) Filed: Jun. 5, 2009

(65) Prior Publication Data

US 2009/0303130 A1 Dec. 10, 2009

(51) Int. Cl.
*G01S 3/02* (2006.01)
(52) U.S. Cl. .................................................. 342/463
(58) Field of Classification Search .................. 342/463, 342/462, 464
See application file for complete search history.

(56) References Cited

U.S. PATENT DOCUMENTS

2003/0220116 A1* 11/2003 Sagefalk et al. ............ 455/456.1
* cited by examiner

*Primary Examiner* — Thomas H Tarcza
*Assistant Examiner* — Harry Liu
(74) *Attorney, Agent, or Firm* — Stites & Harbison, PLLC; Juan Carlos A. Marquez, Esq

(57) ABSTRACT

The present invention provides a method by which the position of a wireless emitter can be estimated by using a minimum of two wireless transceiver devices. The invention relies on physically moving the wireless transceiver devices to new position locations in order to obtain multiple time difference of arrival measurements. The time difference of arrival measurements can then be combined to derive estimates for the position of the emitter. At least one of the two wireless transceiver devices needs to be mobile with the other one fixed. Using this invention, any proportion of mobile and fixed transceiver devices can be used to derive the position of a wireless emitter. The wireless emitter to be located is not assumed to provide any information about itself to the wireless transceivers used for estimating its position location. The method is referred here as a Mobile-TDOA method or M-TDOA. The method is very general, very flexible and can be very inexpensive due to the minimum amount of hardware resources required.

12 Claims, 4 Drawing Sheets

MOBILE SYSTEM AND METHOD FOR POSITION ESTIMATION

BACKGROUND OF THE INVENTION

1. Technical Field

The present subject matter relates to techniques and equipment for finding the position of RF wireless devices.

2. The Prior Art

The most widely used position location technique for geoposition location of mobile wireless stations is the hyperbolic position location technique, commonly known as the time difference of arrival (TDOA) position location method. This technique utilizes cross-correlation methods to calculate the difference in time of arrival (TOA) of a transmitted signal from a Wireless Station to a number of sensors. By measuring the differential delay of the waveforms arriving to the different sensor locations, a set of parabolic surfaces can be constructed which satisfy the differential propagation measurements from the source to each possible pair of sensors. The intersection of these parabolic surfaces dictates possible locations of the source. These intersections, whether among each other or with known surfaces as for example the plane denoting the earth surface, render parabolas which can be used to determine the most likely geolocation of the emitted signal. There are currently a number of well known techniques which minimize different metrics in order to determine the most likely emitter location.

Currently, whether the sensors are mobile or not, the process for locating an emitter is based on taking a sufficient number of measurements at the same time and at different position locations before using those measurements to estimate an emitters' position location. The problem with this is that for any reasonably good accuracy, one needs a considerable number of sensors. The number of sensors needs to be greater or equal to three in order to locate an emitter without uncertainty. In reality, four sensors are needed to derive elevation estimates which will be needed in situations where the emitter is located in hilly or mountainous terrain. In actual systems, the number of sensors needed is much higher than three or four in order to provide accurate enough position location estimates.

SUMMARY OF THE INVENTION

The most widely used position location technique for geolocation of mobile wireless stations is the hyperbolic position location technique, commonly known as the time difference of arrival (TDOA) position location method. This technique utilizes cross-correlation methods to calculate the difference in time of arrival (TOA) of a transmitted signal from a Wireless Station to a number of sensors. By measuring the differential delay of the waveforms arriving to the different sensor locations, a set of parabolic surfaces can be constructed which satisfy the differential propagation measurements from the source to each possible pair of sensors.

The intersection of these parabolic surfaces dictates possible locations of the source. These intersections, whether among each other or with known surfaces as for example the plane denoting the earth surface, render parabolas which can be used to determine the most likely geolocation of the emitted signal. There are currently a number of well known techniques which minimize different metrics in order to determine the most likely emitter location. The most widely used position location technique for geolocation of mobile wireless stations is the hyperbolic position location technique, commonly known as the time difference of arrival (TDOA) position location method. This technique utilizes cross-correlation methods to calculate the difference in time of arrival (TOA) of a transmitted signal from a Wireless Station to a number of sensors. By measuring the differential delay of the waveforms arriving to the different sensor locations, a set of parabolic surfaces can be constructed which satisfy the differential propagation measurements from the source to each possible pair of sensors. The intersection of these parabolic surfaces dictates possible locations of the source. These intersections, whether among each other or with known surfaces as for example the plane denoting the earth surface, render parabolas which can be used to determine the most likely geolocation of the emitted signal. There are currently a number of well known techniques which minimize different metrics in order to determine the most likely emitter location.

Currently, whether the sensors are mobile or not, the process for locating an emitter is based on taking a sufficient number of measurements at the same time and at different position locations before using those measurements to estimate an emitters' position location. The problem with this is that for any reasonably good accuracy, one needs a considerable number of sensors. The number of sensors needs to be greater or equal to three in order to locate an emitter without uncertainty. In reality, four sensors are needed to derive elevation estimates which will be needed in situations where the emitter is located in hilly of mountainous terrains. In actual systems, the number of sensors needed is much higher than three or four in order to provide accurate enough position location estimates. This invention provides a solution which alleviates the need for requiring many sensors.

The invention disclosed here uses a small number of sensor devices, to achieve the same geolocation capabilities as when using a much larger number of sensors. Furthermore, unlike previous geolocation systems, the technique disclosed here requires only a minimum of two sensors. This is achieved by allowing the geolocation algorithm to utilize measurements obtained at different times. This allows the sensor devices to be relocated to different positions in order to acquire additional independent measurements. Under the condition the emitter has not moved while the sensors have been changing positions, the overall set of measurements obtained during the measurement interval can be used to form algebraic equations which contain enough degrees of freedom to accurately geolocate the emitter.

The number of measurements that can be used for a single geolocation estimate is only a function of the speed of the emitter movement relative to the sensors. This new technique disclosed here we will refer to as Mobile-TDOA or in short M-TDOA. The disclosed technique will be disclosed in more detail below.

BRIEF DESCRIPTION OF THE DRAWINGS

The present invention will be described herein below in conjunction with the accompanying drawings illustrating the invention, wherein.

DETAILED DESCRIPTION OF THE PREFERRED EMBODIMENTS

Figure 1:
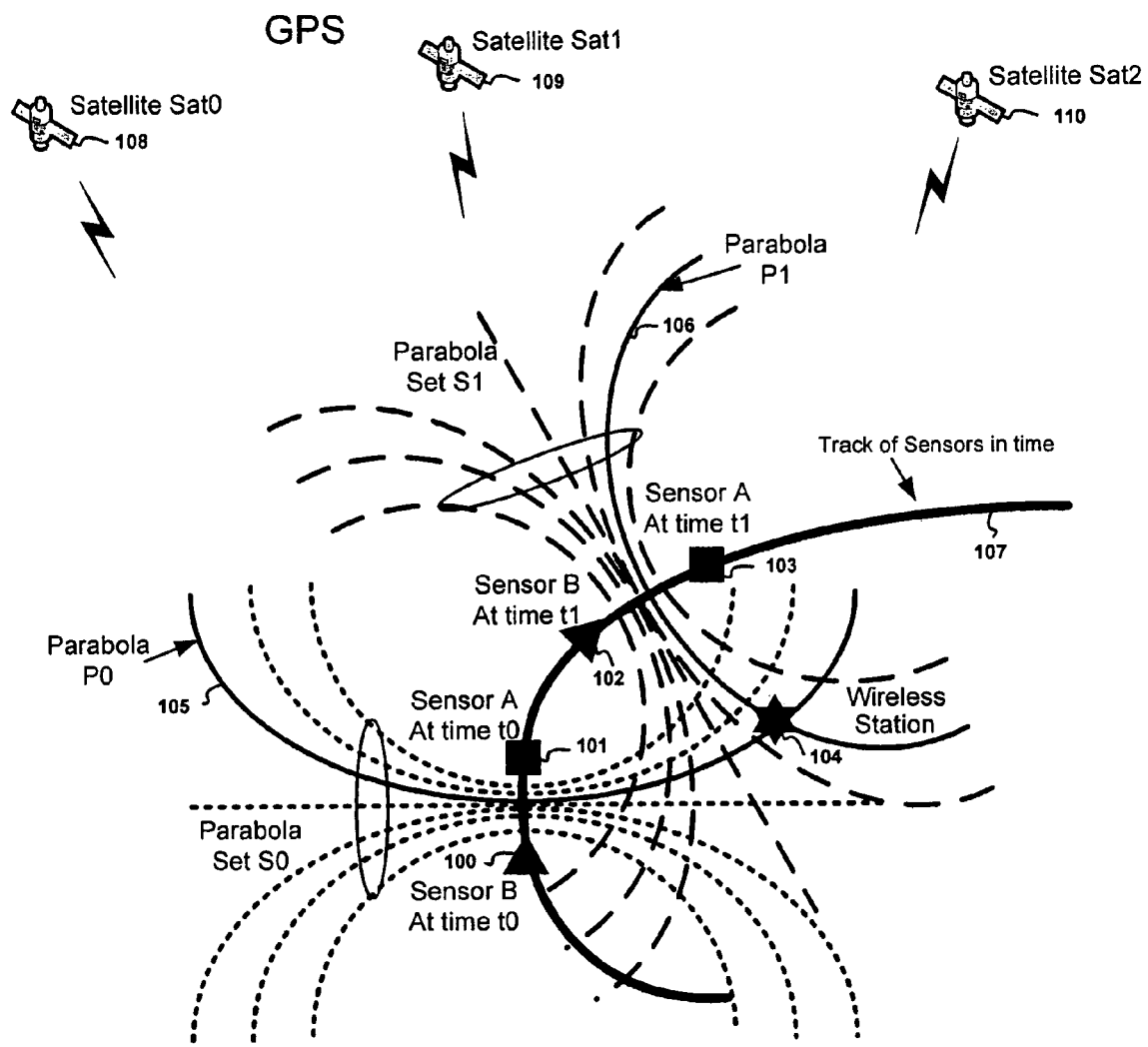
FIG. 1 illustrates a basic diagram showing the parabolas defined by different TDOAs for the two different pairs of position locations for sensors A and B, according to a general embodiment of the present invention.

With reference to the figures, like reference characters will be used to indicate like elements throughout the several embodiments and views thereof. In particular, with reference to FIG. 1, at time t0 the sensors A 101 and B 100 are at physical locations LA0 and LB0 respectively. The two sensors are synchronized so that they can each collect a time segment of the transmitted by the emitter RF signals at about the same time. In this example, we can assume that only a single emitter is present and denoted as the Wireless Station 104.

Aside of the background noise, the two sensors are assumed to receive only the transmitted RF signals from the Wireless Station 104. The timing synchronization is assumed to be accurate enough so that the time intervals over which the collections are made at the two sensors overlap substantially. The sensors, Sensor A and Sensor B, also have the capability of time stamping the onset of the received signal segments very accurately with respect to the time TAB an RF signal takes to propagate from Sensor A to Sensor B. Here, the sensors are assumed to be using a GPS system to obtain geolocation position and time stamping information.

In FIG. 1, Satellites Sat0 108, Sat1 109 and Sat2 110 are shown as part of the GPS satellite network. The two signal segments collected, the position locations of the two sensors, and the time stamps of when the signal segments where received can be used to derive a hyperbolic three dimensional surface in space which defines all the possible position locations of the wireless station. The intersection of this hyperbolic surface with the surface of a flat plane, as the surface of the earth is often modeled as, will look like a hyperbola. Depending where the Wireless Station is located, different hyperbolas will be obtained.

For the case using the two sensors, Sensor A 101 and Sensor B 100 are operating at time t0, these parabolas, denoted here as Parabola Set S0, are shown as short dashed lines with P0 105 the parabola likely to be obtained when the Wireless Station 104 is at the location shown. By having additional pairs of sensors, additional hyperbolas like the one defined by P0 105 can be derived. Here, the additional sensors are obtained by allowing Sensors A and B to move to new locations, where these locations are a substantial distance from their previous locations. For the case using the two sensors, Sensor A and Sensor B are operating at time t1, and they will be denoted by 103 and 102 for Sensor A and Sensor B respectively. At those new locations, and assuming the Wireless Station 104 has not moved appreciably, an additional set of measurements can be obtained. This new set of measurements can then be used to derive another likely parabola defining all possible Wireless Emitter locations. Here, from the Parabola Set S1, P1 106 is defined as the parabola likely to be obtained when the Wireless Station 104 is at the location shown. The intersections of hyperbolas P0 105 and P1 106 further reduce uncertainty for the most likely estimated position location points for the Wireless Station 104. It is evident that two parabolas do not specify the location of the Wireless Emitter unambiguously.

By moving the pair of sensors to yet different locations, additional parabolas can be obtained until the Wireless Emitter 104 can be unambiguously located. When the elevation of the Wireless Station 104 is assumed known, three parabolas will suffice in determining a unique position location for the Wireless Station. Otherwise, an additional fourth parabola will be required, the parabola being obtained through an additional movement and another set of new measurements.

In the case where more than two sensors are available, additional parabolas can be obtained each time the sensors are moved. Clearly, the more sensors and the higher the number of different locations the sensors are moved to, the quicker and more accurately the position location of the Wireless Station can be estimated. The core of the invention here is to use as few sensors as two and still be able to derive the position location of the Wireless Station.

As it is evident, the movement of the sensors creates the effect of having additional sensors (i.e., virtual sensors) operating at the same time. Clearly only measurements taken at the same time can be used to define each hyperbola. The number of hyperbolas used to derive the position location of the Wireless Station, only depends on the number of sensors and the different position locations to which the sensors are moved.

The position locations of the sensors each time the signal segments are collected can be determined by commonly known geolocation methods like GPS and or other methods which are either commercially available or described in the open literature. This disclosure makes no effort in geolocating the sensors themselves rather only the Wireless Station.

It is clear so far the there is no requirement for the Wireless Station to cooperate while the measurements are taken. Thus, this system can be used to locate non-cooperating Wireless Stations as long as their frequency of operation is at least partially known and that the Wireless Station is actually emitting some energy which can be picked up by the sensors.

Operational Scenarios

Figure 2:
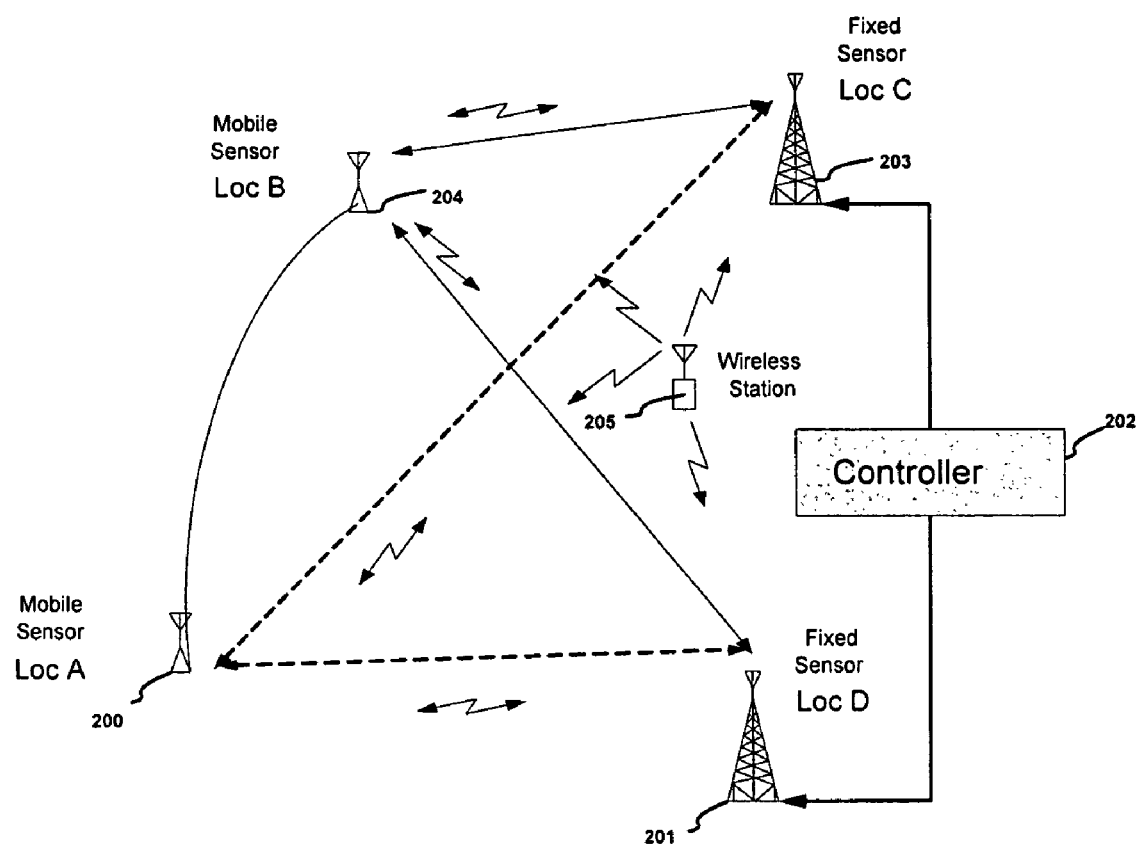
FIG. 2 illustrates a first embodiment for implementing the present invention using a single mobile sensor and two fixed sensors.

The invention as described above can be used under different operational scenarios. The idea behind the invention will be used as long as one or more of the receiving sensors are required to move in order to derive or increase the accuracy of a source geolocation position estimate. For example, as shown in FIG. 2, one sensor can be mobile (Mobile Sensor) supplying measurements from different geographical places and the other two, Fixed Sensor at location "Loc C" and Fixed Sensor at location "Loc D", located at fixed geographical locations. While the Mobile Sensor is at location "Loc A" 200, then the Mobile Sensor and the two Fixed Sensors 201 and 203 can be used to derive two hyperbolas for the position location of the Mobile Station 205. The two hyperbolas are due to the two different independent propagation time differences which can be formed by the three sensors. When the Mobile Sensor moves to another position location, "Loc B" 204, the Mobile Sensor and the two fixed Sensors can then be used again to derive two additional hyperbolas for the position location of the Mobile Station 205. Note that during the movement of the mobile Sensor from Loc A 200 to Loc B 204, the Wireless Station 205 is assumed to be relatively stationary. The four hyperbolas together, can then be used to derive an estimate and the Mobile Station's 205 position location. The Mobile Sensor can continue moving thus supplying further information about deriving new hyperbolas denoting possible position locations of the Mobile Station 205.

Figure 3:
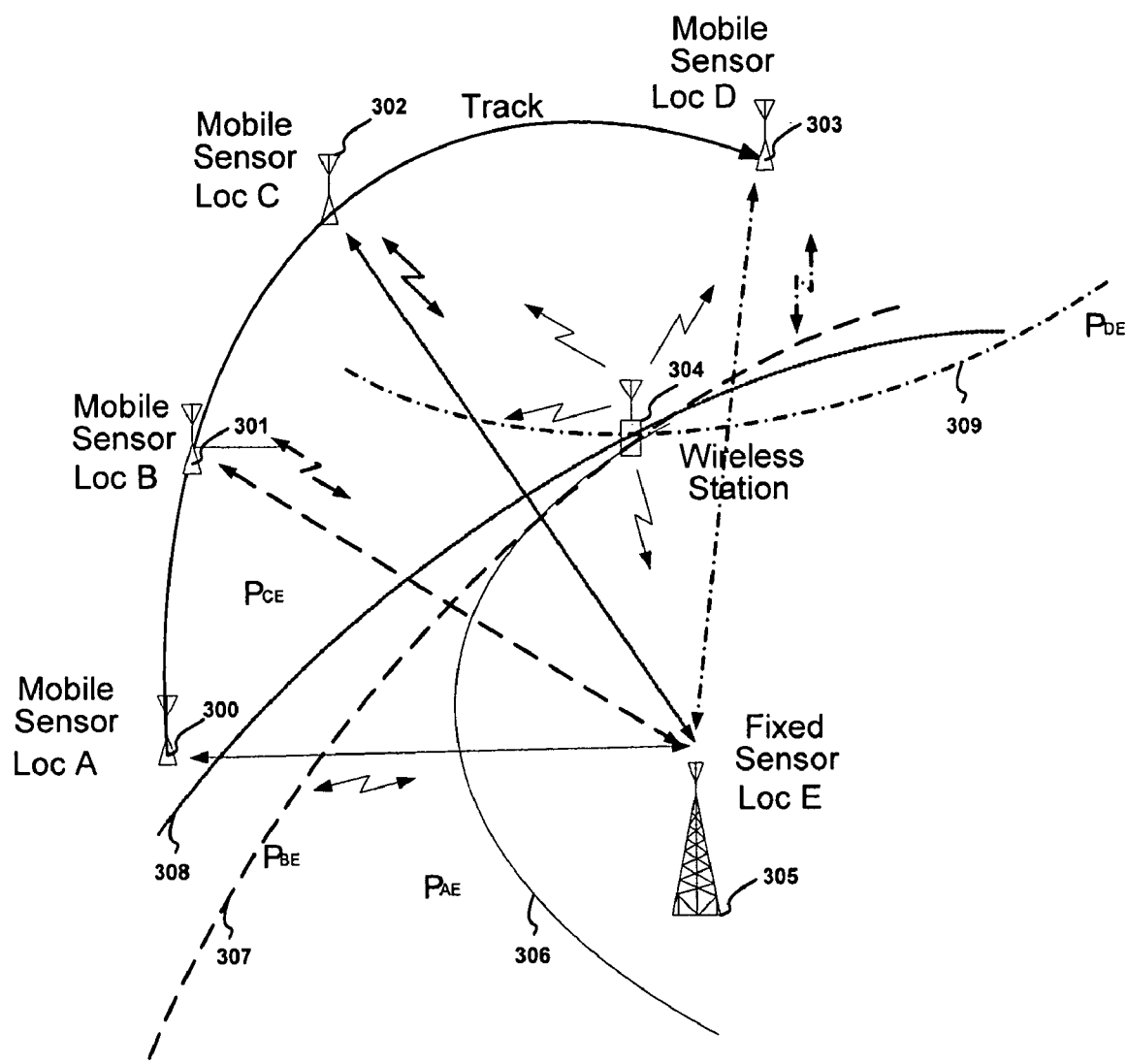
FIG. 3 illustrates a second embodiment for implementing the present invention using a single mobile sensor and one fixed sensor.

In FIG. 3, a single Mobile Sensor and a single Fixed Sensor are use to determine the position location of the Wireless Station. As the Mobile Station moves from position location "Loc A" 300 to "Loc B" 301, to "Loc C" 302 and "Loc D" 303, four hyperbolas can be defined. These four hyperbolas (or planes when in three dimensions) are denoted by $P_{AE}$ 306, $P_{BE}$ 307, $P_{CE}$ 308 and $P_{DE}$ 309, derived by the measurements obtained at the four different position locations of the Mobile Sensors and the fixed position location of the Fixed Sensor but at four different times. Assuming the Wireless Station 304 has not moved while the Mobile Sensor has moved from position locations "Loc A" 300 to "Loc D" 303, the four hyperbolas can be used to obtain an estimate of the Wireless Station geolocation position. Additional hyperbolas can be used to increase the accuracy of this estimate as long as the Wireless Station 304 has not moved to a new position location at a distance beyond the accuracy required.

Clearly, the combinations and numbers of Mobile and Fixed sensors which the system can accommodate are infinite. This represents a great flexibility of the system. That is, the accuracy of the position location estimate can be controlled by the number of Mobile and fixed Sensors used and the number of times the Mobile Transmitters are moved.

Locating Multiple Emitters

The invention disclosed here can be used to estimate the position locations of many wireless emitters at the same time. As long as the emitters are not collocated, the cross-correlation of pairs of measurement segments will produce multiple peaks with different peaks due the signals received from different emitters. Clearly, there is an uncertainty of which peaks correspond to each other over the different cross-correlation segments. For wildly disparate measurements in time, these peaks will be difficult to associate to certain emitters. If however, the measurement times are closed to each other where the peaks can now be tracked, it should be possible to provide an accurate peak to emitter association. An example in point can be observed by the use of FIG. 3. The relative position location of the peaks in the cross-correlation vector obtained by the two signal segments when the Mobile Sensor was at position location "Loc A" 300 will be very similar to the relative position location of the peaks in the cross-correlation vector obtained while the Mobile Sensor was at position location "Loc B" 301. Tracking the movement of the peaks in time, the system should be able to retain an accurate association between peaks derived from correlation vectors obtained at different times.

Another discriminate in locating multiple emitters is to perform a filtering operation before the cross-correlation operation. By searching emitters at different frequencies, the emitters can easily be separated. The cross-correlation processor will then have to perform as many cross-correlation operations as the number of different frequency bands the system is operating upon.

Clearly, there is a great variety of ways the different emitters can be separated by filtering and follow up cross-correlation. For example, if a narrowband and a broadband signal share the same bandwidth, the narrowband signal can be filtered out first and the position location of the broadband signal estimated, or the filtered narrowband signal can be used to derive its position location estimate.

For signals which reside in narrowband channels as the GSM uplink signals for example, a pre-filtering can isolate particular channels upon which the cross-correlation and the rest of emitter position location analysis can be imposed upon.

Sensor System Description

Figure 4:
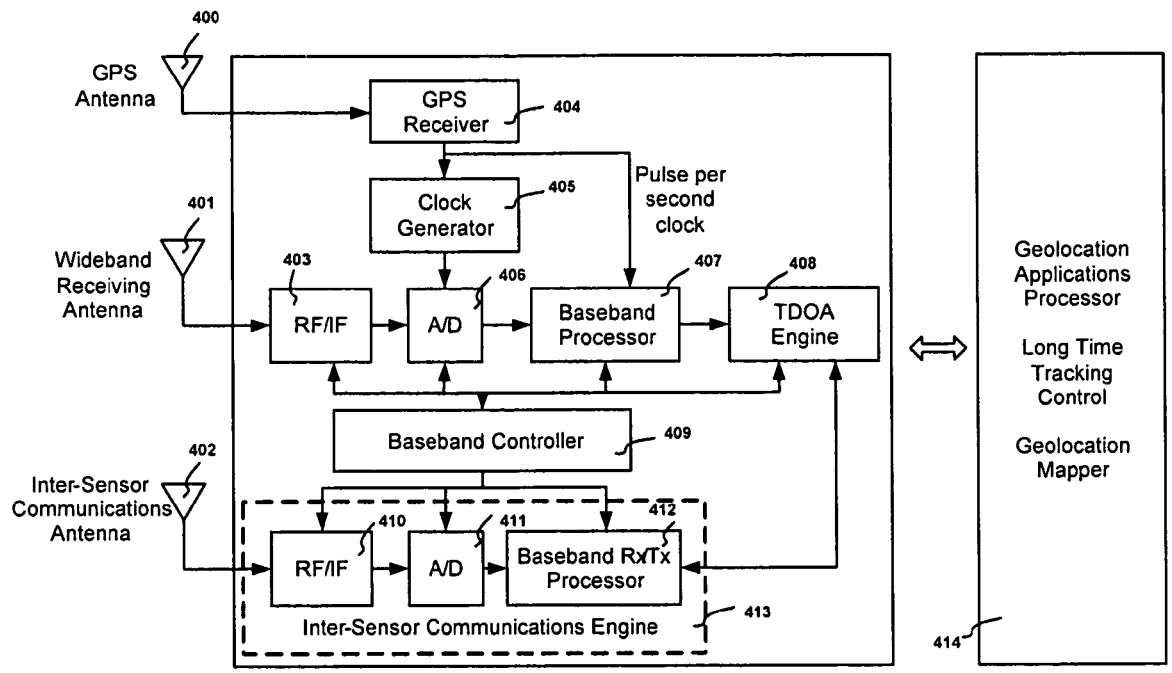
FIG. 4 is a general block diagram of the M-TDOA capable sensor according to the present invention.

The general block diagram associated with the above disclosed M-TDOA capable sensor is shown in FIG. 4. As shown, the signals transmitted by the emitter to be geolocated are received through the wideband receiving antenna 401. The received emitter signal is then filtered and down converted by the RF/IF circuit 403 and then digitized by the analog to digital (A/D) converter 406. The baseband processor 407 collects an appropriate digitized local signal segment from the A/D converter 406, it process it and supplies it to the TDOA engine 408. The TDOA engine 408 performs the cross correlations between the processed local signal segment and the received processed signals from the various other sensors and performs the required TDOA algorithm processing. Here it is shown that all the sensors are equipped with their own TDOA engine, however since there is inter-sensor communications it is only necessary that at least one of the sensors in the set of cooperating sensors is capable of performing the operations required by the TDOA engine. A single sensor will be able to coordinate all the measurements from all the sensors and derive the geolocation coordinates of the emitter(s). The sensor shown here is equipped with a GPS geolocation/timing synchronization sub-system 404 capable of providing accurate clock synchronization between sensors and time tagging capabilities. The clock derived by the GPS receiver 404 is conditioned by the clock generator 405 and distributed throughout the remaining system. The pulse per second clock is very valuable for performing the necessary time tagging of the emitter collected signal waveforms. The inter-sensor communications is supported by the inter-sensor communications engine 413 which is comprised with a complete wireless communications system providing inter-sensor communications and coordination capabilities. The collected signal segments and derived time tags from each sensor are sent to at least one sensor in order to perform the necessary TDOA operations. The inter-sensor communications link needs to be fast enough in order to be able to transfer the collected signal segments well within the required emitter geolocation update rate. It is possible that the TDOA processing is implemented in a distributive manner so that additional sensors has some TDOA processing capabilities in a way that the overall geolocation processing task is performed by more than one sensor. The processing results will again have to come to a single location in order to derive the final emitter location estimates. The processing can also be carried out at a fixed sensor location were the availability of fast processing is in general much higher.

The baseband controller 409 in each sensor will be responsible for fast inter-sensor communication and coordination, whereas the applications processor 414 will be responsible for displaying the TDOA results, perform high level processing such as removing estimated emitter coordinates which might be due to various processing artifacts and tracking the movement of the emitter. Coordinated movement of the sensors via higher level analysis of the emitter movement and known local geographical information is also possible for more accurate TDOA functionality. For example, knowing the sensor locations and estimated emitter location, the future locations of the sensors can be coordinated so that optimum location of the sensors is achieved with respect to the possible TDOA accuracy attainable.

In the disclosed invention herein, no particular TDOA processing algorithm is specified. However, there is a large number of algorithms known in the art which can be used to derive a TDOA based geolocation estimate for the wireless emitter. Most algorithms do not require the computation of intersecting parabolic surfaces in three dimensions or line parabolas in two dimensions, rather a point which based on some error minimization approach is the most likely position location of the wireless emitter. For example, the point which minimizes the squared distance of the geolocation estimates to the parabolic surfaces defined by the measurements.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

I claim:

1. A method for determining current position location information of a wireless station using at least a first and a second mobile wireless sensor, comprising the steps of:
   receiving a first RF transmission segment from the wireless station at the first mobile wireless sensor at a first predetermined position location and a first time instant;
   receiving a second RF transmission segment from the wireless station at the second mobile wireless sensor at a second predetermined position location and at approximately the same first time instant;
   correlating the first RF transmission segment with the second RF transmission segment to generate a first correlation data segment;
   determining a first time difference of arrival between a first time at which the first mobile wireless sensor receives the first RF transmission segment at the first predetermined position location and a second time at which the second mobile wireless sensor receives the second RF transmission segment at the second predetermined position location in response to a correlation peak from the first correlation data segment;
   determining a first surface in three-dimensional space that defines first possible position locations of the wireless station based on at least the first time difference of arrival, the first predetermined position location and the second predetermined position location;
   receiving a third RF transmission segment from the wireless station at the first mobile wireless sensor at a third predetermined position location and a second time instant;
   receiving a fourth RF transmission segment from the wireless station at the second mobile wireless sensor at a fourth predetermined position location and at approximately the same second time instant;
   correlating the third RF transmission segment with the fourth RF transmission segment to generate a second correlation data segment;
   determining a second time difference of arrival between a third time at which the first mobile wireless sensor receives the third RF transmission segment at the third predetermined position location and a fourth time at which the second mobile wireless sensor receives the fourth RF transmission segment at the fourth predetermined position location in response to a correlation peak from the second correlation data segment;
   determining a second surface in three-dimensional space that defines second possible position locations of the wireless station based on at least the second time difference of arrival, the third predetermined position location and the fourth predetermined position location; and
   determining intersected possible position locations of the wireless station based on an intersection of the first and second surfaces in three-dimensional space.

2. A method according to claim 1, further comprising the steps of:
   receiving a fifth RF transmission segment from the wireless station at the first mobile wireless sensor at a fifth predetermined position location and a third time instant;
   receiving a sixth RF transmission segment from the wireless station at the second mobile wireless sensor at a sixth predetermined position location and at approximately the same third time instant;
   correlating the fifth RF transmission segment with the sixth RF transmission segment to generate a third correlation data segment;
   determining a third time difference of arrival between a fifth time at which the first mobile wireless sensor receives the fifth RF transmission segment at the third predetermined position location and a sixth time at which the second mobile wireless sensor receives the sixth RF transmission segment at the sixth predetermined position location in response to a correlation peak from the third correlation data segment;
   determining a third surface in three-dimensional space that defines third possible position locations of the wireless station based on at least the third time difference of arrival, the fifth predetermined position location and the sixth predetermined position location; and
   determining the intersected possible position locations of the wireless station based on an intersection of the first, second and third surfaces in three-dimensional space.

3. A method according to claim 1, further comprising the steps of:
   receiving a fifth RF transmission segment from the wireless station at the first mobile wireless sensor at a fifth predetermined position location and a third time instant;
   receiving a sixth RF transmission segment from the wireless station at the second mobile wireless sensor at a sixth predetermined position location and at approximately the same third time instant;
   correlating the fifth RF transmission segment with the sixth RF transmission segment to generate a third correlation data segment;
   determining a third time difference of arrival between a fifth time at which the first mobile wireless sensor receives the fifth RF transmission segment at the third predetermined position location and a sixth time at which the second mobile wireless sensor receives the sixth RF transmission segment at the sixth predetermined position location in response to a correlation peak from the third correlation data segment; and
   determining intersected possible position locations of the wireless station based on at least the first time differences of arrival, the second time difference of arrival, the third time difference of arrival, the first predetermined position location, the second predetermined position location, the third predetermined position location, the fourth predetermined position location, the fifth predetermined position location, and the sixth predetermined position location in three-dimensional space.

4. A method for determining current position location of a wireless station using at least first and second wireless sensors, comprising the steps of:
   receiving at a first time instant a first RF transmission segment from the wireless station at each of the first and second wireless sensors, each of the first and second wireless sensors being at a first and second predetermined position location, respectively;
   receiving at a second time instant a second RF transmission segment from the wireless station at each of the first and second wireless sensors, each of the first and second wireless sensors being at third or fourth predetermined position location, respectively;
   correlating the first RF transmission segment relative to first wireless sensor with the first RF transmission segment relative to the second wireless sensor to generate a first correlation data segment;
   correlating the second RF transmission segment relative to first wireless sensor with the second RF transmission segment relative to the second wireless sensor to generate a second correlation data segment;

determining a first time difference of arrival between a first time at which the first wireless sensor receives the first RF transmission segment at the first predetermined position location and a second time at which the second wireless sensor receives the first RF transmission segment at the second predetermined position location in response to a correlation peak from the first correlation data segment;

determining in a computer-implemented device a first surface in three-dimensional space that defines first possible position locations of the wireless station based on at least the first time difference of arrival, the first predetermined position location and the second predetermined position location;

determining a second time difference of arrival between a third time at which the first wireless sensor receives the second RF transmission segment at the third predetermined position location and a fourth time at which the second wireless sensor receives the second RF transmission segment at the fourth predetermined position location in response to a correlation peak from the second correlation data segment;

determining in the computer-implemented device a second surface in three-dimensional space that defines second possible position locations of the wireless station based on at least the second time difference of arrival, the third predetermined position location and the fourth predetermined position location; and determining intersected possible position locations of the wireless station based on an intersection of the first and second surfaces in three-dimensional space.

5. A method according to claim 4, further comprising the steps of:

receiving at a third time instant a third RF transmission segment from the wireless station at each of the first and second wireless sensors, each of the first and second wireless sensors being at fifth and sixth predetermined position location, respectively;

correlating the third RF transmission segment relative to first wireless sensor with the third RF transmission segment relative to the second wireless sensor to generate a third correlation data segment;

determining a third time difference of arrival between a fifth time at which the first wireless sensor receives the third RF transmission segment at the fifth predetermined position location and a sixth time at which the second wireless sensor receives the third RF transmission segment at the sixth predetermined position location in response to a correlation peak from the third correlation data segment;

determining in the computer-implemented device a third surface in three-dimensional space that defines third possible position locations of the wireless station based on at least the third time difference of arrival, the fifth predetermined position location and the sixth predetermined position location; and determining intersected possible position locations of the wireless station based on an intersection of the first, second and third surfaces in three-dimensional space.

6. A method according to claim 4, wherein the first and second wireless sensors are mobile, and the first through sixth predetermined position locations are different from one another.

7. A method according to claim 4, wherein the first wireless sensor is mobile, and the second wireless sensor is a fixed site, wherein the first, third and fifth predetermined position locations are different from one another.

8. A method for determining current position location information of a wireless station using at least a first and a second mobile wireless sensor, comprising the steps of:

receiving a first RF transmission segment from the wireless station at the first mobile wireless sensor at a first predetermined position location and a first time instant;

receiving a second RF transmission segment from the wireless station at the second mobile wireless sensor at a second predetermined position location and at approximately the same first time instant;

correlating the first RF transmission segment with the second RF transmission segment to generate a first correlation data segment;

determining a first time difference of arrival between a first time at which the first mobile wireless sensor receives the first RF transmission segment at the first predetermined position location and a second time at which the second mobile wireless sensor receives the second RF transmission segment at the second predetermined position location in response to a correlation peak from the first correlation data segment;

receiving a third RF transmission segment from the wireless station at the first mobile wireless sensor at a third predetermined position location and a second time instant;

receiving a fourth RF transmission segment from the wireless station at the second mobile wireless sensor at a second predetermined position location and at approximately the same second time instant;

correlating the third RF transmission segment with the fourth RF transmission segment to generate a second correlation data segment;

determining a second time difference of arrival between a third time at which the first mobile wireless sensor receives the third RF transmission segment at the third predetermined position location and a fourth time at which the second mobile wireless sensor receives the fourth RF transmission segment at the fourth predetermined position location in response to a correlation peak from the second correlation data segment; and determining intersected possible position locations of the wireless station based on at least the first time differences of arrival, second time difference of arrival, the first predetermined position location, the second predetermined position location, the third predetermined position location, and the fourth predetermined position location in three-dimensional space.

9. A method for determining current position location of a wireless station using at least first and second wireless sensors, comprising the steps of:

receiving at a first time instant a first RF transmission segment from the wireless station at each of the first and second wireless sensors, each of the first and second wireless sensors being at a first and second predetermined position location, respectively;

receiving at a second time instant a second RF transmission segment from the wireless station at each of the first and second wireless sensors, each of the first and second wireless sensors being at third and fourth predetermined position location, respectively;

correlating the first RF transmission segment relative to first wireless sensor with the first RF transmission segment relative to the second wireless sensor to generate a first correlation data segment;

correlating the second RF transmission segment relative to first wireless sensor with the second RF transmission segment relative to the second wireless sensor to generate a second correlation data segment;

determining a first time difference of arrival between a first time at which the first wireless sensor receives the first RF transmission segment at the first predetermined position location and a second time at which the second wireless sensor receives the first RF transmission segment at the second predetermined position location in response to a correlation peak from the first correlation data segment;

determining a second time difference of arrival between a third time at which the first wireless sensor receives the second RF transmission segment at the third predetermined position location and a fourth time at which the second wireless sensor receives the second RF transmission segment at the fourth predetermined position location in response to a correlation peak from the second correlation data segment; and determining in the computer-implemented device intersected possible position locations of the wireless station based on at least the first time differences of arrival, second time difference of arrival, the first predetermined position location, the second predetermined position location, the third predetermined position location, and the fourth predetermined position location in three-dimensional space.

10. A method according to claim 9, further comprising the steps of:

receiving at a third time instant a third RF transmission segment from the wireless station at each of the first and second wireless sensors, each of the first and second wireless sensors being at fifth and sixth predetermined position location, respectively;

correlating the third RF transmission segment relative to first wireless sensor with the third RF transmission segment relative to the second wireless sensor to generate a third correlation data segment;

determining a third time difference of arrival between a fifth time at which the first wireless sensor receives the third RF transmission segment at the fifth predetermined position location and a sixth time at which the second wireless sensor receives the third RF transmission segment at the sixth predetermined position location in response to a correlation peak from the third correlation data segment; and determining intersected possible position locations of the wireless station based on at least the first time differences of arrival, the second time difference of arrival, the third time difference of arrival, the first predetermined position location, the second predetermined position location, the third predetermined position location, the fourth predetermined position location, the fifth predetermined position location, and the sixth predetermined position location in three-dimensional space.

11. A method according to claim 9, wherein the first and second wireless sensors are mobile, and the first through sixth predetermined position locations are different from one another.

12. A method according to claim 9, wherein the first wireless sensor is mobile, and the second wireless sensor is a fixed site, wherein the first, third and fifth predetermined position locations are different from one another.

* * * * *